US009522444B2

(12) United States Patent
Sasinowski et al.

(10) Patent No.: US 9,522,444 B2
(45) Date of Patent: Dec. 20, 2016

(54) FAN SHROUD AND SEAL RING ASSEMBLY, AND METHOD THEREOF

(71) Applicant: GM GLOBAL TECHNOLOGY OPERATIONS LLC, Detroit, MI (US)

(72) Inventors: Raymond H. Sasinowski, Brighton, MI (US); Adrian O. Balmaceda, Fair Haven, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1057 days.

(21) Appl. No.: 13/688,364

(22) Filed: Nov. 29, 2012

(65) Prior Publication Data

US 2014/0147257 A1 May 29, 2014

(51) Int. Cl.
*B60K 11/04* (2006.01)
*B23P 11/00* (2006.01)
*F04D 29/52* (2006.01)
*F04D 29/54* (2006.01)
*F04D 29/64* (2006.01)
*F01P 5/06* (2006.01)

(52) U.S. Cl.
CPC ............... *B23P 11/00* (2013.01); *B60K 11/04* (2013.01); *F01P 5/06* (2013.01); *F04D 29/522* (2013.01); *F04D 29/545* (2013.01); *F04D 29/646* (2013.01); *B60Y 2304/072* (2013.01); *Y10T 29/49904* (2015.01)

(58) Field of Classification Search
CPC ......... B60K 11/00; B60K 11/04; B60K 11/06; F01P 5/02; F01P 5/06; F01P 11/10; F01P 2070/50; F01P 2070/52; F04D 29/40; F04D 29/52; F04D 29/646; F04D 29/545; F04D 29/522
USPC ...................................... 180/68.1, 68.4, 68.6
See application file for complete search history.

(56) References Cited

U.S. PATENT DOCUMENTS

| | | | | |
|---|---|---|---|---|
| 4,018,297 A * | 4/1977 | Haupt | .................... | B60K 11/02 123/41.49 |
| 4,329,946 A * | 5/1982 | Longhouse | ............... | F01P 5/06 123/41.49 |
| 4,522,160 A * | 6/1985 | Speers | ...................... | F01P 5/06 123/41.49 |
| 5,410,992 A * | 5/1995 | Hunt | ........................ | F01P 5/06 123/41.49 |
| 6,123,051 A * | 9/2000 | Kubina | .................... | F01P 11/10 123/41.49 |
| 6,196,169 B1 * | 3/2001 | Schreiner | ................. | F01P 11/10 123/41.49 |
| 6,439,843 B1 * | 8/2002 | Finkenbinder | ........ | F04D 29/162 415/172.1 |

(Continued)

*Primary Examiner* — James M Dolak
(74) *Attorney, Agent, or Firm* — Quinn Law Group

(57) ABSTRACT

A fan shroud and seal ring are assembled together to allow a condenser, radiator, and fan module (CRFM) to be vertically loaded into an engine compartment of a vehicle to be mounted to the vehicle chassis and engine with a fan stator. The fan shroud has a plurality of first attachment components, and the seal ring has a plurality of second attachment components, each of which corresponds to a first attachment component. Each first attachment component engages with a corresponding second attachment component to secure the seal ring to the fan shroud, such that the seal ring is positioned around at least a portion of the fan stator after the CRFM has been mounted and the assembly is in its final configuration.

5 Claims, 4 Drawing Sheets

(56) References Cited

U.S. PATENT DOCUMENTS

| | | | | |
|---|---|---|---|---|
| 8,182,217 B2* | 5/2012 | Schaffer | ............... | F01P 5/06 |
| | | | | 415/214.1 |
| 8,221,074 B2* | 7/2012 | Nelson | ............... | F04D 29/526 |
| | | | | 415/213.1 |
| 8,256,551 B2* | 9/2012 | Entriken | ............... | F01P 1/06 |
| | | | | 123/41.49 |
| 8,376,884 B2* | 2/2013 | Spaggiari | ............... | B60H 1/00464 |
| | | | | 474/184 |
| 8,454,718 B2* | 6/2013 | Buchmann | ............... | F01P 11/12 |
| | | | | 55/385.3 |
| 9,357,672 B2* | 5/2016 | Hartmann | ............... | F04D 29/646 |
| 9,374,914 B2* | 6/2016 | Hartmann | ............... | F04D 29/545 |
| 2006/0272800 A1* | 12/2006 | Wong | ............... | F01P 11/10 |
| | | | | 165/120 |
| 2008/0236518 A1* | 10/2008 | Schaffer | ............... | F01P 5/06 |
| | | | | 123/41.49 |

* cited by examiner

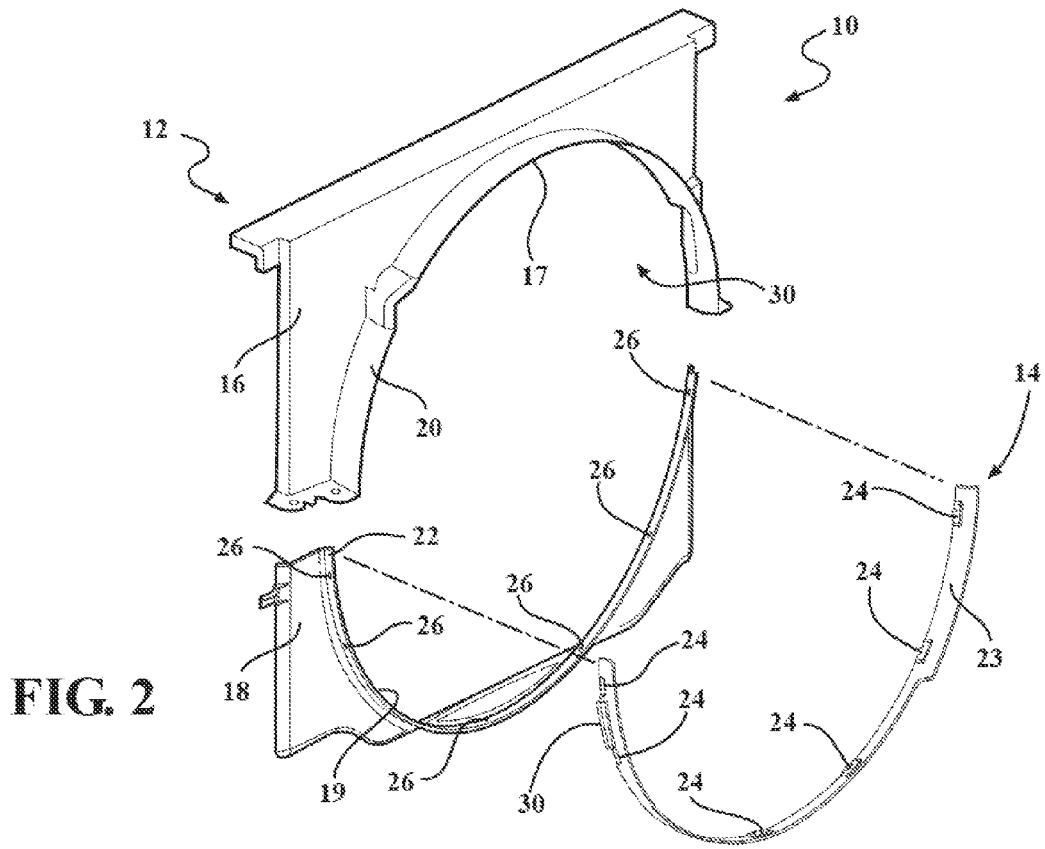
FIG. 2
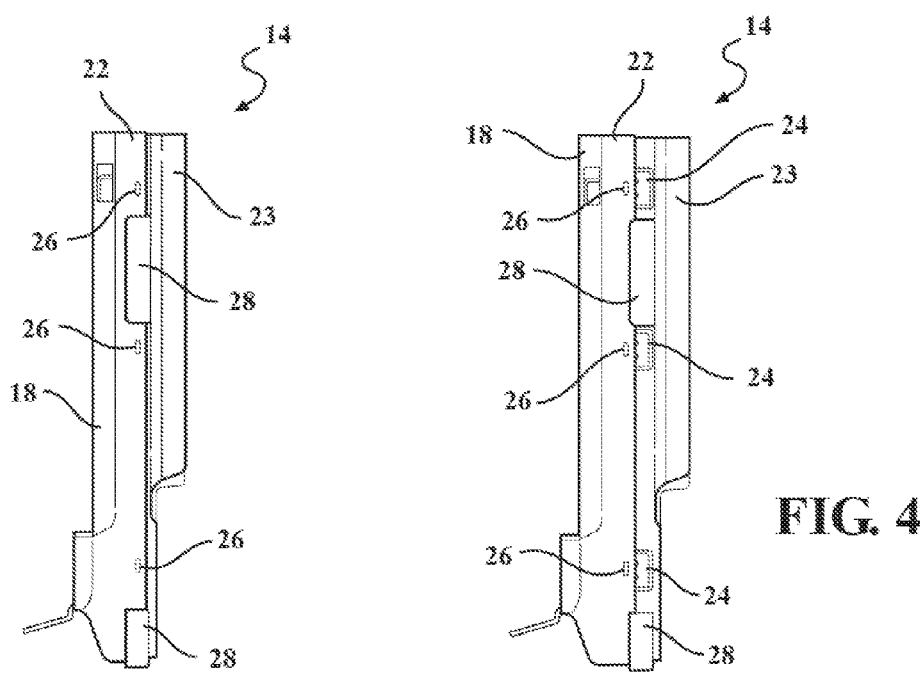
FIG. 3
FIG. 4

FAN SHROUD AND SEAL RING ASSEMBLY, AND METHOD THEREOF

TECHNICAL FIELD

The present invention relates to a fan shroud and seal ring assembly to allow vertical loading and unloading of a condenser, radiator, and fan module (CRFM) into and from an engine compartment of a vehicle, and a method thereof.

BACKGROUND

Heat exchangers are commonly utilized in vehicles for various functions, including, but not limited to, cooling the engine, cooling and heating the passenger compartment of the vehicle, and the like. Two heat exchangers, the radiator and the condenser, are typically located in the engine compartment of a vehicle. As such, they are often combined with an engine cooling fan in a condenser, radiator, and fan module (CRFM).

The radiator and condenser are generally rectangular in shape, whereas the cooling fan is generally circular in shape. As such, a fan shroud may be included to act as an adapter to direct the airflow from the circular fan through the rectangular heat exchangers for a more efficient heat transfer. A fan stator may also be included, for example, where the cooling fan is an engine-driven mechanical fan. The fan stator allows for a tighter tolerance around the fan tips, which further improves air flow across the heat exchangers and the engine. A seal ring may be included to provide a seal between the fan shroud and the fan stator. Where the engine compartment of the vehicle has sufficient space, the CRFM and fan shroud combination is often loaded horizontally in the engine compartment to be mounted to the vehicle chassis and engine, which may require the use of a vehicle pit or lift.

SUMMARY

A fan shroud and seal ring assembly is provided. The assembly may allow vertical loading of a condenser, radiator, and fan module (CRFM) into an engine compartment of a vehicle to be mounted to the vehicle chassis and engine with a fan stator. The vertical loading of the CRFM may be particularly useful when limited space within the engine compartment hinders the ability to load the CRFM horizontally. It may further simplify installation of the CRFM by eliminating the need for a vehicle pit or lift.

The fan shroud and seal ring assembly includes a fan shroud and a seal ring. The fan shroud has a fan opening in which the fan module of the CRFM sits, and a plurality of first attachment components. The fan shroud may be one piece or two pieces, an upper shroud component and a lower shroud component. The seal ring is shaped and sized substantially the same as at least a portion of the border of the fan opening, and may fit within or around the fan opening. The seal ring has a plurality of second attachment components, each of which corresponds to a first attachment component on the fan shroud. The first attachment components engage with the corresponding second attachment components to align and attach the seal ring to the fan shroud such that the seal ring is positioned around at least a portion of the fan stator after the CRFM is mounted and the assembly is in its final configuration.

In one embodiment of the present invention, the fan shroud may further have a flange around at least a portion of the fan opening, where the flange extends outwardly from the fan opening. In this embodiment, the first attachment components may be receiving slots in the flange of the fan shroud. The second attachment components may be retention tabs that extend outwardly from an edge or surface of the seal ring, where each retention tab is configured to engage with one of the receiving slots. When all of the receiving slots have received all of the retention tabs, the seal ring is secured to the fan shroud in an extended position. The seal ring may further have at least one retention flange configured to engage with the flange of the fan shroud to hold the seal ring in a retracted position. The seal ring may slide from the retracted position into the extended position.

In another embodiment of the present invention, the seal ring may further have a flange that extends radially from a surface of the seal ring. In this embodiment, the first attachment components may be retention posts protruding from a surface of the fan shroud. The second attachment components may be retention holes in the flange of the seal ring, where each retention hole is configured to receive one of the retention posts. When all of the retention holes have received all of the retention posts, the seal ring and the fan shroud will be properly aligned with and secured to each other. The fan shroud and the seal ring may further comprise at least one first receiving hole and at least one second receiving hole, respectively. The at least one first receiving hole is substantially concentrically aligned with the second receiving hole such that they may receive a common retention pin to secure the seal ring to the fan shroud.

A method of vertically loading the CRFM into the engine compartment of the vehicle so that it may be mounted to the vehicle chassis and engine with a fan stator is also provided. The method incorporates the fan shroud and the seal ring described above. In one embodiment in which the first and second attachment components are receiving slots and retention tabs, respectively, the seal ring may be first attached to the fan shroud in the retracted position via the at least one retention flange. The fan shroud may then be attached to the CRFM. Alternatively, this may be performed prior to attaching the seal ring to the fan shroud in the retracted position. The fan shroud, with the seal ring, and CRFM may then be lowered vertically into the engine compartment, and mounted to the vehicle chassis. The seal ring may then be slid from the retracted position into the extended position. As described above, each of the retention tabs engage with a corresponding receiving slot to secure the seal ring in the extended position such that the seal ring is positioned around at least a portion of the fan stator.

In another embodiment in which the first and second attachment components are retention posts and retention holes, respectively, the seal ring may first be positioned around at least a portion of the fan stator, in preparation of being attached to the fan shroud. The fan shroud may then be attached to the CRFM. Similar to above, this may be performed prior to positioning the seal ring around the fan stator. The fan shroud and the CRFM may then be lowered vertically into the engine compartment, and mounted to the vehicle chassis. The seal ring may then be secured to the fan shroud such that the seal ring is positioned around at least a portion of the fan stator when all of the retention holes receive all of the retention posts. Where the fan shroud and the seal ring further have receiving holes, a retention pin may then be inserted into each pair of receiving holes to further secure the seal ring to the fan shroud.

The above features and advantages, and other features and advantages, of the present invention are readily apparent from the following detailed description of some of the best modes and other embodiments for carrying out the inven-

BRIEF DESCRIPTION OF THE DRAWINGS

FIG. 2 is a schematic, exploded perspective view of an assembly of a fan shroud and a seal ring in accordance with one embodiment of the present invention;

FIG. 3 is a schematic, side view of the assembly of FIG. 2, where the seal ring is attached to a lower shroud component of the fan shroud in a retracted position;

FIG. 4 is a schematic, side view of the assembly of FIG. 2, where the seal ring is attached to the lower shroud component of the fan shroud in an extended position;

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
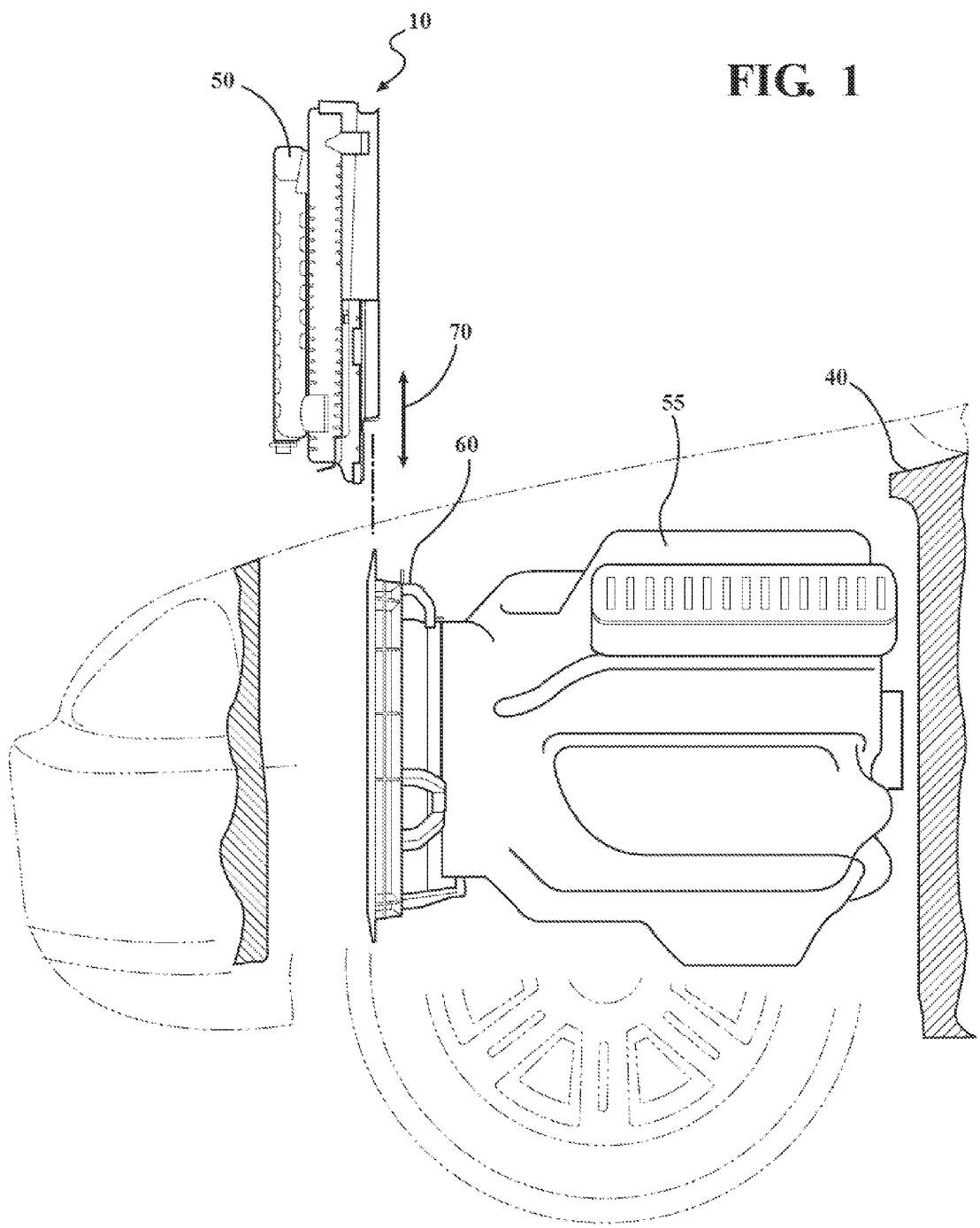
FIG. 1 is a schematic, partial cross-sectional view of an engine compartment of a vehicle, illustrating the vertical loading and unloading of a condenser, radiator, and fan module (CRFM) into and from the engine compartment.

Referring to the drawings, wherein like reference numbers correspond to like or similar components wherever possible throughout the several figures, a fan shroud and seal ring assembly 10 is shown. As depicted in FIG. 1, the assembly 10 allows a condenser, radiator, and fan module (CRFM) 50 to be vertically loaded into an engine compartment 45 of a vehicle, and mounted to the vehicle chassis 40 and engine 55 with a fan stator 60. The vertical loading of the CRFM 50 may be particularly useful when limited space within the engine compartment 45 hinders the ability to load the CRFM 50 horizontally. It may further simplify installation of the CRFM 50 by eliminating the need for a vehicle pit or lift.

Referring to FIG. 2, the assembly 10 is shown in an exploded view with the components unassembled. The assembly 10 generally includes a fan shroud 12 and a seal ring 14. The fan shroud 12 includes a plurality of first attachment components, discussed hereinafter, and the seal ring 14 includes a plurality of second attachment components, discussed hereinafter, each of which corresponds to one of the first attachment components. Each first attachment component engages with the corresponding second attachment component to align and secure the seal ring 14 to the fan shroud 12 such that the seal ring 14 is positioned around at least a portion of the fan stator 60 after the CRFM 50 has been mounted and the assembly 10 is in its final configuration.

The fan shroud 12 further has a fan opening 30 in which the fan module of the CRFM 50 sits and through which air is directed. The fan shroud 12 may have an upper shroud component 16 and a lower shroud component 18, which form the upper boundary 17 and lower boundary 19, respectively, of the fan opening 30. After the CRFM 50 is mounted in the engine compartment 45, the upper shroud component 16 or the lower shroud component 18 may be individually removed to access components of the CRFM 50, such as the fan clutch, which may eliminate the need to remove the entire fan shroud 12 for maintenance and servicing. In another embodiment not shown, the fan shroud 12 may be just one piece having the fan opening 30.

The upper shroud component 16 and the lower shroud component 18 may have an upper flange 20 defining the upper boundary 17, and a lower flange 22 defining the lower boundary 19, respectively, that extend outwardly from the fan opening 30. In embodiments in which the fan shroud 12 is just one piece, there may be just one flange around the fan opening 30. The lower flange 22, or the lower half of a singular flange, generally will not extend as far as the upper flange 20, or upper half of the singular flange. This will allow the vertical loading path of the CRFM 50 to be as close to the fan stator 60 as possible, with the seal ring 14 in a retracted position during vertical loading, as discussed hereinafter.

The seal ring 14 has a base component 23 that generally is shaped and sized substantially the same as at least a portion of the border of the fan opening 30 such that the seal ring 14 may fit within or around the fan opening 30. As depicted in FIG. 2, the base component 23 may be half of the fan opening 30 so that the seal ring 14 may fit within the fan opening 30 and attach to the lower shroud 18, as depicted in FIGS. 3 and 4 and discussed hereinafter. In another embodiment not shown, the base component 23 may be a fully enclosed ring.

Figure 5:
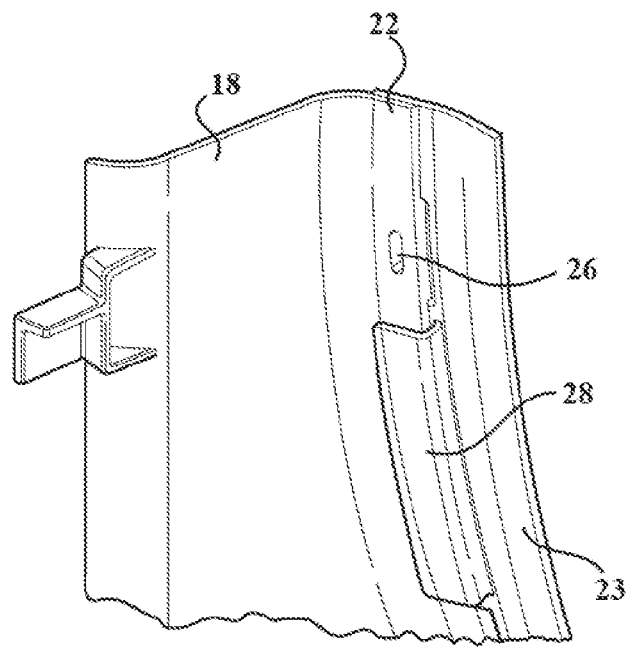
FIG. 5 is a schematic, fragmentary, enlarged perspective view of the assembly of FIG. 1 in the retracted position.

Referring to FIG. 3, the seal ring 14 is shown attached to the lower shroud 18 in a retracted position via retention flanges 28, as further depicted in FIG. 5. Referring to FIG. 5, the retention flange 28 is configured to engage with the lower flange 22 to hold the seal ring 14 in the retracted position. The retention flange 28 may be configured such that it forms a channel with an outer surface of the seal ring 14, where the lower flange 22 fits within the channel.

Referring back to FIG. 1, the retracted position will allow the CRFM 50 to be lowered or lifted vertically such that the vertical path 70 of the upper flange 20 overlaps with the fan stator 60. Because the seal ring 14 is in the retracted position, with the lower flange 22 not extending as far outwardly as the upper flange 20 as explained above, the seal ring 14 will not interfere with the fan stator 60 during vertical loading and unloading of the CRFM 50. In the final configuration, after the CRFM 50 has been mounted to the vehicle chassis 40, the upper flange 20 is positioned around an upper portion of the fan stator 60, thereby acting as an upper seal between the fan shroud 12 and the fan stator 60. The seal ring 14 may then be slid into an extended position, as depicted in FIG. 4 and discussed below, such that the seal ring 14 is positioned around a bottom portion of the fan stator 60, thereby completing the seal between the fan shroud 12 and the fan stator 60.

Figure 6:
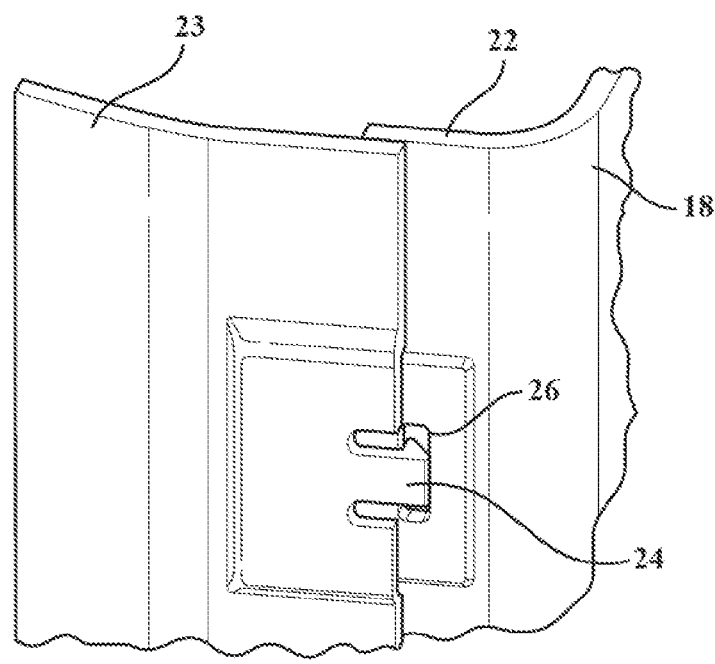
FIG. 6 is a schematic, fragmentary, enlarged perspective view of the assembly of FIG. 1 in the extended position.

Referring to FIG. 4, the seal ring 14 is shown attached to the lower shroud 18 in the extended position via a plurality of retention tabs 24 (first attachment components) on the seal ring 14, and a plurality of corresponding receiving slots 26 (second attachment components) in the lower flange 22. Each retention tab 24 is configured to engage with a corresponding receiving slot 26, as depicted in FIG. 6, such that the seal ring 14 will be secured in the extended position. Each retention tab 24 is further configured to disengage from the slot 26 such that the seal ring 14 may be transitioned from the extended position back to the retracted position. It should be appreciated that any mechanism suitable for locking the seal ring 14 to the fan shroud 12 may be utilized in lieu of the receiving slots 26 and retention tabs 24.

Figure 7:
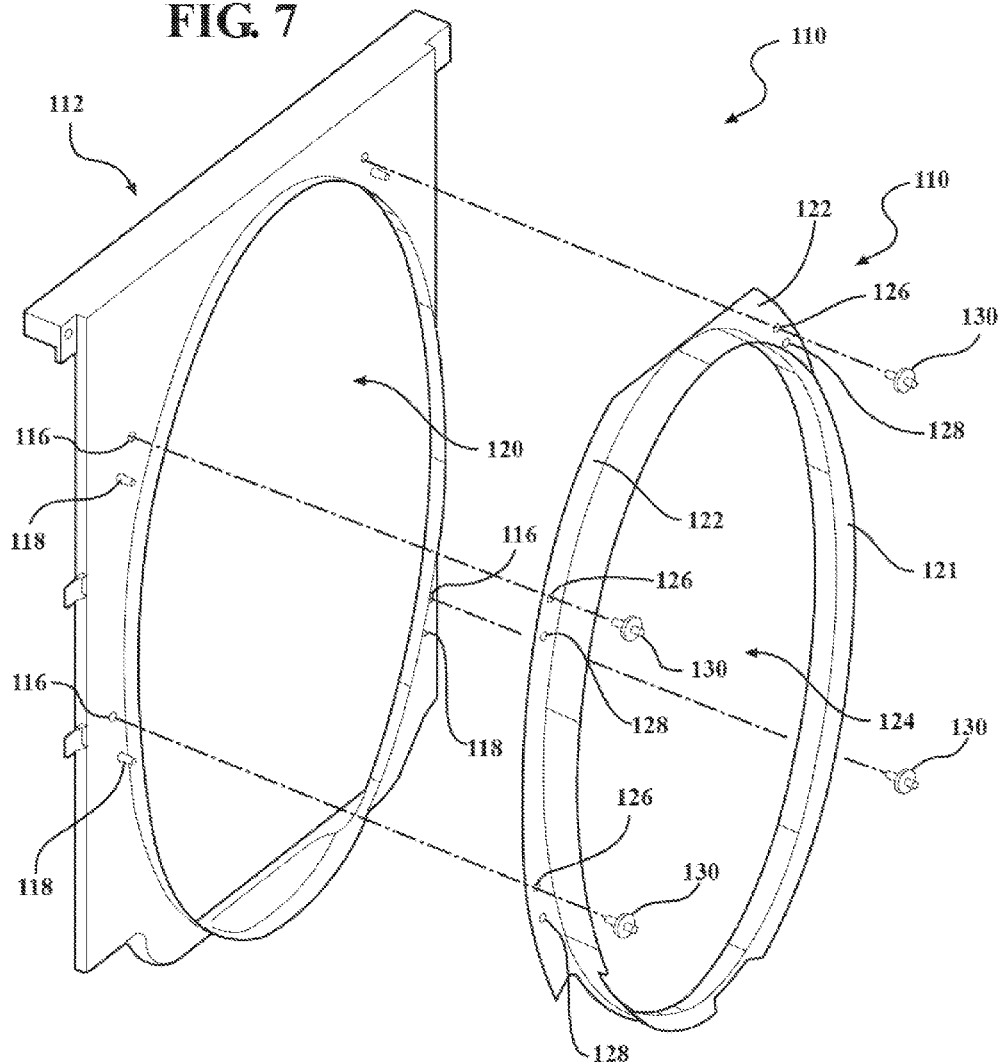
FIG. 7 is a schematic, exploded perspective view of an assembly of a fan shroud and a seal ring in accordance with one embodiment of the present invention.

Referring to FIG. 7, a fan shroud and seal ring assembly 110, according to another embodiment of the present invention, is shown. As with assembly 10, assembly 110 generally includes a fan shroud 112 and a seal ring 114. While the fan shroud 112 is shown as one piece, it should be appreciated that the fan shroud 112 may have more than one piece, such as an upper shroud component and a lower shroud component. The fan shroud 112 has a fan opening 120 in which the fan of the CRFM fits and through which air is directed.

The seal ring 114 has a base component 121 and a flange 122 that extends radially from a surface of the base component 121. The base component 121 may be a complete ring encircling a ring opening 124. In another embodiment not shown, the base component 121, as well as the flange 122, may be more than one piece.

The seal ring 114 attaches to the fan shroud 112 via a plurality of retention posts 118 (first attachment components) that protrude from a surface of the fan shroud 112, and a plurality of corresponding retention holes 128 (second attachment components) in the flange 122. Each retention post 118 is configured to engage with a corresponding receiving hole 128 such that the seal ring 114 is aligned with and secured to the fan shroud 112.

The fan shroud 112 may further include a plurality of first receiving holes 116, and the seal ring 114 may further include a plurality of second receiving holes 126. The first receiving holes 116 and the second receiving holes 126 are substantially concentrically aligned such that they may receive a common retention pin 130 to further secure the seal ring 114 to the fan shroud 112. While four sets of first and second receiving holes 116 and 126, and retention pins 130, are shown, it should be appreciated that any number are contemplated. The retention pins 130 may include, but are not limited to, push pins, dowels, screws, and the like. It should further be appreciated that any means of securing the sealing ring 114 to the fan shroud 112 is contemplated.

Figure 8:
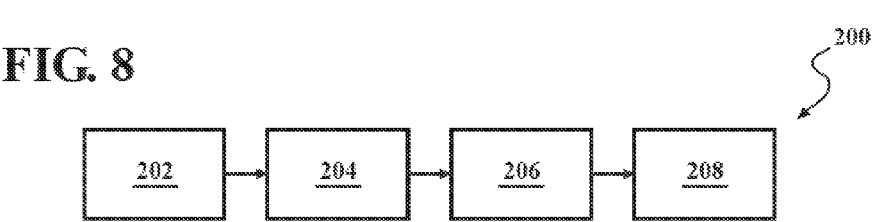
FIG. 8 is a flow diagram illustrating an exemplary method of using the assembly of FIG. 2 or FIG. 7 to vertically load and mount the CRFM into the engine compartment of the vehicle.

Referring to FIG. 8, a method 200 of vertically loading the CRFM into the engine compartment to be mounted to the vehicle chassis and engine with a fan stator is shown. While method 200 is discussed with respect to assemblies 10 or 110, it should be appreciated that any fan shroud and seal ring assembly within embodiments of the present invention may be utilized in method 200.

Method 200 begins with step 202 in which the fan shroud 12, 112 is attached to the CRFM 50.

When assembly 10 is used, method 200 may include attaching the seal ring 14 to the fan shroud 12 in the retracted position via the retention flanges 28 prior to step 202. When assembly 110 is used, method 200 may include positioning the seal ring 114 around the fan stator 60 in preparation of being secured to the fan shroud 112, as discussed in step 208 below, prior to step 202. Either of these additional steps may alternatively be performed after step 202.

After step 202, method 200 proceeds to step 204. At step 204, the fan shroud 12, 112 and the CRFM 50 are loaded vertically into the engine compartment 45 of the vehicle. As method 200 may be utilized in situations in which there is limited space in the engine compartment 45, the fan shroud 12, 112 and CRFM 50 should be lowered such that there is a minimal horizontal clearance between the vertical loading path and the fan stator 60, which is already installed in the engine compartment 45 prior to the start of method 200. As explained above, when assembly 10 is used in method 200, the vertical path 70 of the upper flange 20 may overlap with the fan stator 60 such that, after the CRFM 50 is mounted and the assembly 10 is in the final configuration, the upper flange 20 is positioned around at least a portion of the fan stator 60 to form the upper seal between the fan shroud 12 and the fan stator 60.

After step 204, method 200 proceeds to step 206. At step 206, the CRFM 50 is mounted to the vehicle chassis 40.

After step 206, method 200 proceeds to step 208. At step 208, the seal ring 14, 114 is secured to the fan shroud 12, 112 such that the seal ring 14, 114 is positioned around at least a portion of the fan stator 60 to create a seal between the fan shroud 12, 112 and the fan stator 60.

When assembly 10 is used in method 200, step 208 may be accomplished by sliding the seal ring 14 from the retracted position into the extended position. As explained above, this occurs when the retention tabs 24 on the seal ring 14 engage with the corresponding receiving slots 26 on the fan shroud 12.

When assembly 110 is used in method 200, step 208 may be accomplished by moving the seal ring 114, which is positioned around the fan stator 60, toward the fan shroud 112 until the retention holes 128 receive the retention posts 118. Additionally, method 200 may further include inserting retention pins 130 into the pair of receiving holes 116 and 126 located in the fan shroud 112 and the seal ring 114, respectively.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A fan shroud and seal ring assembly to allow vertical loading of a condenser, radiator, and fan module (CRFM) into an engine compartment of a vehicle to be mounted to a vehicle chassis and engine with a fan stator, the assembly comprising:
   a fan shroud having:
      a shroud body;
      a shroud flange extending from the shroud body;
      a fan opening in which the fan module of the CRFM sits, the fan opening having a border defined by the shroud flange; and
      a plurality of retention slots; and
   a seal ring including a base component having a shape that substantially corresponds with the shape of at least a portion of the border of the fan opening, the seal ring having a plurality of retention tabs, the base component having an inner base surface and an outer base surface opposite the inner base surface, and the base component having a front base surface and a rear base surface opposite the front base surface, the front base surface extending between the outer base surface and the inner base surface, and the rear base surface extending between the outer base surface and the inner base surface;
   wherein the seal ring includes at least one retention flange coupled to the base component, the at least one retention flange is spaced radially outward relative to the outer base surface of the base component such that the at least one retention flange and the outer base surface jointly define a channel therebetween, and the shroud flange is sized to be received within the channel;

wherein the seal ring is movably coupled to the fan shroud such that the seal ring is movable relative to the fan shroud between a retracted position and an extended position, and the rear base surface is closer to the shroud body when the seal ring is in the retracted position than when the seal ring is in the extended position;

wherein the shroud flange is disposed within the channel when the seal ring is in the retracted position, such that the seal ring is attached to the fan shroud when the seal ring is in the retracted position; and wherein the retention tabs engage with the corresponding retention slots to align and attach the seal ring to the fan shroud such that the seal ring is positioned around at least a portion of the fan stator when the seal ring is the extended position.

2. The fan shroud and seal ring assembly of claim 1 wherein the fan shroud and the seal ring further comprise at least one first receiving hole and at least one second receiving hole, respectively, the at least one first receiving hole being substantially concentrically aligned with the at least one second receiving hole.

3. The fan shroud and seal ring assembly of claim 1 wherein the fan shroud comprises an upper shroud component and a lower shroud component.

4. A fan shroud and seal ring assembly to allow vertical loading of a condenser, radiator, and fan module (CRFM) into an engine compartment of a vehicle to be mounted to a vehicle chassis and engine with a fan stator, the assembly comprising:

a fan shroud having:
  a shroud body;
  a shroud flange extending from the shroud body;
  a fan opening in which the fan module of the CRFM sits, wherein the shroud flange defines the fan opening;
  a plurality of receiving slots formed in the shroud flange; and
a seal ring including a base component having a shape that substantially corresponds to at least a portion of a border of the fan opening, the seal ring having:
  a plurality of retention tabs extending outwardly from the base component of the seal ring, wherein the base component defines a front base surface and a rear base surface opposite the front base surface;
  at least one retention flange engaging with the shroud flange of the fan shroud to hold the seal ring in a retracted position;
  wherein the seal ring is movably coupled to the fan shroud such that the seal ring is movable relative to the fan shroud between the retracted position and an extended position, and the rear base surface is closer to the shroud body when the seal ring is in the retracted position than when the seal ring is in the extended position;
  wherein the retention tabs engage corresponding receiving slots when the seal ring is the extended position; and
  wherein the at least one retention flange engages the shroud flange when the seal ring is in the retracted position.

5. The fan shroud and seal ring assembly of claim 4 wherein the fan shroud comprises an upper shroud component and a lower shroud component.

* * * * *